June 22, 1948.  P. J. OVREBO  2,443,637
DIRECT READING RADIO-FREQUENCY WATTMETER
Filed Oct. 16, 1945
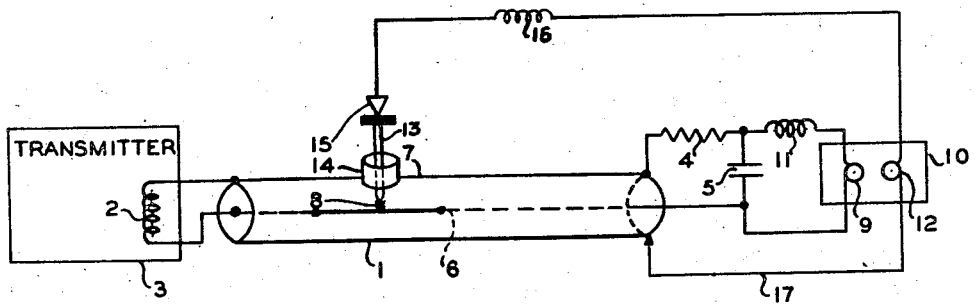
INVENTOR
PAUL J. OVREBO
BY
*William D. Hall.*
ATTORNEY Patented June 22, 1948

2,443,637

UNITED STATES PATENT OFFICE 2,443,637

DIRECT READING RADIO-FREQUENCY WATTMETER

Paul J. Ovrebo, Dayton, Ohio

Application October 16, 1945, Serial No. 622,641

3 Claims. (Cl. 171—95)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to measuring devices and particularly to means for measuring the power output of a radio transmitter.

An object of this invention is to provide an improved direct-reading wattmeter for measuring radio-frequency power delivered by a transmitter.

For a better understanding of the invention together with other objects thereof, reference is had to the following detailed description taken in connection with the accompanying drawing which presents a schematic illustration of the invention.

Referring now to the drawing, the present invention is adapted to be utilized in conjunction with a coaxial transmission line 1 which is coupled in any suitable way to the output of the transmitter 3, for example, by means of a pickup coil 2. Preferably the line 1 has a suitable lossy dielectric such as rubber or a mixture of sand and colloidal graphite the latter sold under the trade-mark "Aquadag," so that it will absorb a portion of the transmitter output, and it is terminated in a resistor 4 which is connected in series with a capacitor 5 between the inner and outer conductors 6 and 7, respectively, of the line 1. Capacitor 5 serves as a radio-frequency bypass. The resistor 4 presents the desired impedance for terminating the line 1 and it dissipates the balance of the power delivered by the transmitter 3 to the line 1.

A thermocouple 8 having its two elements placed in series with the center conductor 6 of the transmission line 1 sets up a direct-current potential which causes a direct current to flow through a series circuit including the inner coaxial conductor 6 and the current coil 9 of an electrodynamometer 10 or similar type of measuring instrument suitable for use as a wattmeter. This circuit is completed through a radio-frequency choke 11, the resistor 4, outer coaxial conductor 7, and pickup coil 2. The capacitor 5, which shunts the series combination of coil 9 and choke 11, presents a short circuit to radio-frequency currents and an open circuit insofar as direct current is concerned. The choke 11 further aids to prevent the flow of radio-frequency current through the coil 9. The direct current flowing through coil 9 is a function of the radio-frequency current delivered by the transmitter to the load.

The wattmeter 10 includes a voltage coil 12 which is connected in a circuit extending from a probe 13 that is inserted through a plug 14 of polystyrene or other insulating material in the outer conductor 7, this probe being located at substantially the same point in the line 1 as the thermocouple 8. The probe 13 is connected through a crystal rectifier 15 and a radio-frequency choke 16 to the coil 12, the circuit being completed through a conductor 17 having an electrical connection with the outer conductor 7 of the line 1. The rectified current flowing through the coil 12 is a measure of the R.-F. potential in the region of the thermocouple 8. The resulting torque between the coils 9 and 12 is a function of a power dissipated in the load, this being indicated by the deflection of the meter 10.

The wattmeter 10 can be calibrated directly in terms of watts by placing the lossy line 1 and terminating resistor 4 in an air calorimeter. Air is forced into the calorimeter and the temperatures of the air at the entrant and exit points is noted. The rise in temperature of the air is a function of the power dissipated by the line. A conversion chart is used to convert the temperature change readings into watts. The wattmeter may also be calibrated electrically in any convenient manner. Likewise, the voltage and current readings may be taken separately and power output obtained from the product of the two readings.

While there has been illustrated and described a preferred embodiment of the invention, it will be apparent to persons skilled in the art that various modifications can be made therein without departing from the spirit of the invention.

The invention claimed is:

1. A radio-frequency wattmeter comprising a lossy transmission line having coaxially arranged inner and outer conductors, a resistor terminating said line, said resistor having an impedance equal to the characteristic impedance of said line, a capacitor connected in series with said resistor between said inner and outer conductors, an electrodynamometer having current and voltage coils, a first radio-frequency choke connected in series with said current coil, said first choke and said current coil being connected in parallel with said capacitor, a thermocouple embodied in said inner conductor, a probe inserted through said outer conductor in the region of said thermocouple, a crystal rectifier, and a second radio-frequency choke, said voltage coil, said second choke and said rectifier being included in a series circuit extending between said probe and said outer conductor, whereby the deflection of said electrodynamometer is indicative of the power dissipated in said line and said load.

2. A wattmeter for measuring the power output of a high-frequency radio transmitter comprising a coaxial transmission line having inner and outer conductors, a load, said line and said load being arranged in a circuit with said transmitter, means inserted in said inner conductor for obtaining a rectified current as a function of radio-frequency current flowing in said line, means inserted between said inner and outer conductors for obtaining a rectified current as a function of radio-frequency potential across said line, means responsive to both of the rectified currents for indicating the watts dissipated in said line and said load and means for excluding radio frequency currents from said indicating means.

3. In combination with a radio transmitter and a load, a coaxial transmission line, a direct-current electrodynamometer, a thermocouple associated with said line, a probe associated with said line, a rectifier in series with said probe, means whereby the E. M. F. produced by said thermocouple is effective to energize a current coil of said electrodynamometer, means whereby the R.-F. potential detected by said probe is effective to energize a voltage coil of said electrodynamometer and means for excluding radio frequency currents from said electrodynamometer.

PAUL J. OVREBO.

REFERENCES CITED

The following references are of record in the file of this patent:

UNITED STATES PATENTS

| Number | Name | Date |
| --- | --- | --- |
| 2,205,873 | Buschbeck | June 25, 1940 |
| 2,344,641 | Rosencrans | Mar. 21, 1944 |
| 2,402,663 | Ohl | June 25, 1946 |
| 2,407,075 | Gurewitsch | Sept. 3, 1946 |